United States Patent [19]
Marshall et al.

[11] 3,924,012
[45] Dec. 2, 1975

[54] METHODS FOR FORMING UNIT PORTIONS OF FROZEN FOOD MATERIALS

[75] Inventors: Robert Swinburn Marshall, Lowestoft, England; Karl Hartmann, Bremerhaven-Speckenbuttel; Erich Kraffert, Langen, both of Germany

[73] Assignee: Lever Brothers Company, New York, N.Y.

[22] Filed: Sept. 18, 1973

[21] Appl. No.: 398,524

[30] Foreign Application Priority Data
Sept. 21, 1972 United Kingdom............... 43751/72
Apr. 6, 1973 United Kingdom............... 16736/73

[52] U.S. Cl. ..................... 426/518; 83/157; 83/620; 99/537; 100/DIG. 10; 225/103
[51] Int. Cl.² ..................... B26D 5/00; A23P 1/00
[58] Field of Search ........... 426/414, 512, 513, 517, 426/518, 524, 145, 146, 149; 99/537, 486; 83/389, 157, 404, 620; 100/DIG. 10; 99/111, 100 R; 225/103, 104, 105; 17/52

[56] References Cited
UNITED STATES PATENTS 2,742,087  4/1956  Smith et al............................. 83/157
2,916,986  12/1957  Lebovitz......................... 426/518 X
3,433,647  3/1969  Johnston......................... 426/272 X
3,579,359  3/1971  Schjolberg......................... 426/513

FOREIGN PATENTS OR APPLICATIONS
554,194  1/1957  Italy..................................... 83/620

*Primary Examiner*—S. Leon Bashore
*Assistant Examiner*—Steve Alvo
*Attorney, Agent, or Firm*—James J. Farrell, Esq.

[57] ABSTRACT

A method of forming unit portions of frozen food material, particularly from fish fillets to form fish sticks, where slabs of frozen material are sub-divided into the desired portions by being sheared by a special form of shear press which has opposing castellated jaws which each have corresponding alternate protruding and receding sections which intermesh with corrresponding sections of the opposite jaw and which sections correspond in width to the widths of the portions. Various methods of handling the sheared portions are also described.

8 Claims, 15 Drawing Figures

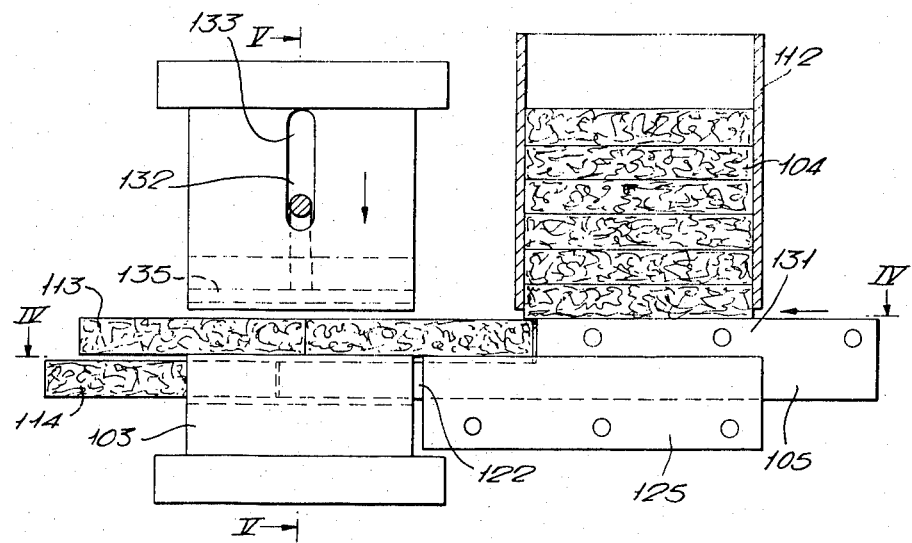
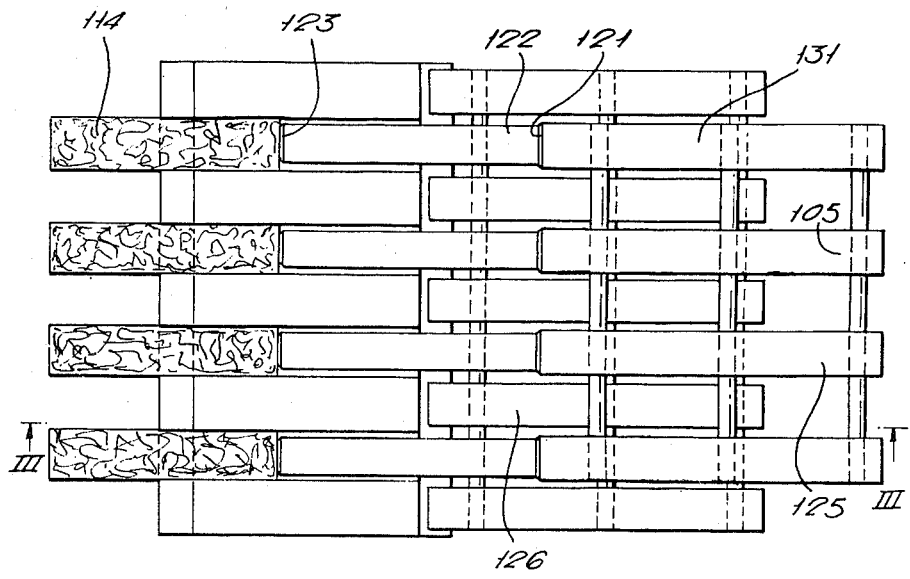

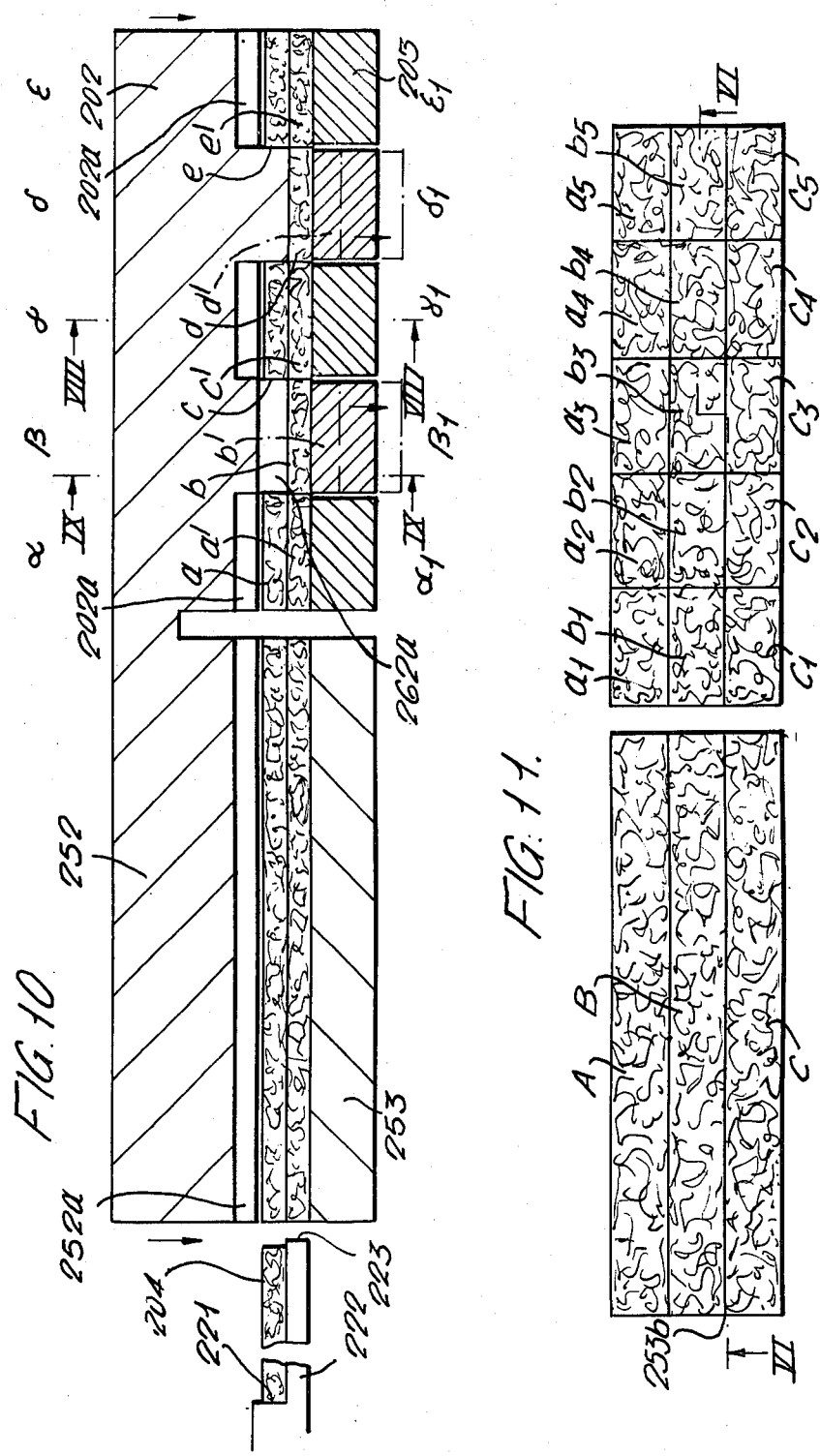

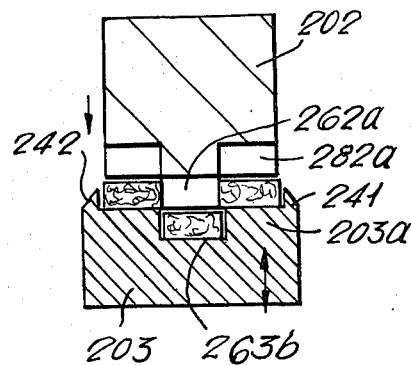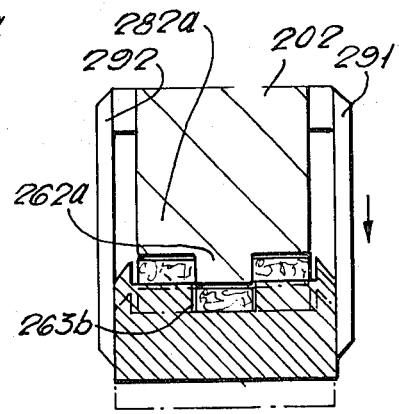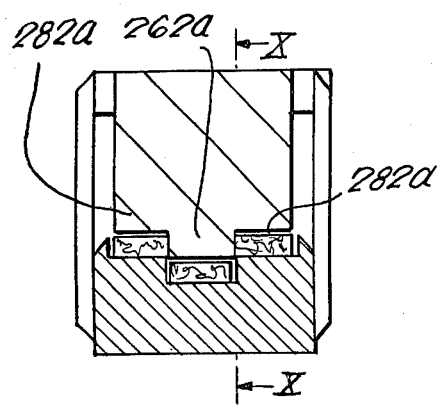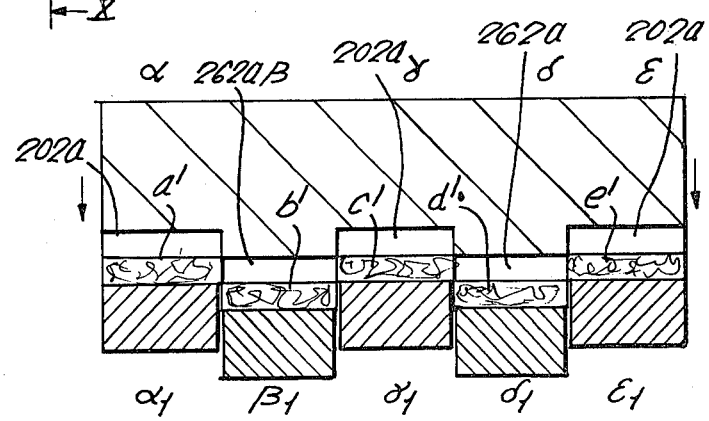

METHODS FOR FORMING UNIT PORTIONS OF FROZEN FOOD MATERIALS

The present invention relates to methods and apparatus for forming unit portions of frozen food material.

Frozen fish fingers are normally made by taking fillets of fish such as cod, forming these into a slab of frozen material, sub-dividing the slab into portions of fish finger size, and subsequently battering or breadcrumbing the sub-divided units, followed by lightly frying, refreezing and packing the units. Other unit portions of frozen fish are also produced by this method as are, with appropriate variations, unit portions of meat and even vegetables, e.g. frozen spinach puree.

The invention relates to the particular step of this overall process where the frozen slabs are sub-divided into unit portions. Such unit portions may be the final size required, e.g. of a fish finger, or an intermediate to this end.

The usual method of sub-division is to use saws or knives, but these tend to be inaccurate, to need frequent replacement, and to produce a high wastage through the production of saw-dust and chippings. The chippings also result in inaccuracy of weight of the cut portions.

Desirably any new method of sub-division should overcome the above problems as well as being particularly suitable for mass production.

Accordingly the present invention provides a method of forming unit portions of frozen food material, for example frozen fish, comprising the steps of bringing each slab in turn between opposing castellated jaws of a press having in each jaw alternate protruding and receding sections in which each protruding section has a substantially flat jaw face, a width corresponding to the width of the required unit portions and is shaped to closely intermesh with a receding section of the opposing jaw, bringing the jaws together so that the protruding sections evenly contact the slab, and moving the jaws towards and intermeshing position so as to shear and thereby sub-divide the slab into unit portions.

By the term castellated we mean that the jaws have in side elevation a form which defines alternate protruding and receding sections where each section is basically rectangular (cf the battlements of a castle).

The sections should be able to intermesh with the minimum of clearance so that the plane of shearing, i.e., a straight line between corners of opposing protruding sections is as near to a right angle with the jaw face as possible. Thus as square a shear as possible is achieved, and moreover the side faces of each protruding section can then provide a polishing action on the sheared side faces of each unit portion immediately after shearing and during further movement of the shear press jaws.

Preferably the width of each protruding section of each jaw is at least twice the width of the slab of material to be sheared. Satisfactory shearing can be achieved on thicker materials, but then greater care has to be taken to ensure that the material to be sheared is fully clamped before shearing takes place. whether or not the slab is fully clamped it is essential that the slab is evenly contacted by the jaws of the shear press before shearing commences.

The main advantages of the method according to the invention are that a plurality of unit portions can be pressed out in a single movement and the edges of the sheared unit portions are formed particularly accurately without saw-cutting losses. A further advantage is that subsequent to shearing, the portions are in a regular configuration, and this facilitates further handling operations.

The slabs may be formed by placing fillets of fish in mould trays and freezing, or by other methods of moulding or extruding frozen material or by cutting from a larger block of frozen material.

Reference to the movement towards the intermeshing position is to be understood to include situations where movement stops before intermeshing between opposing protruding sections actually occur, although it will be realised that better results are obtained when intermeshing does occur.

Thus, it should be understood that shearing is not simply a question of cutting, as with a pair of scissors where two cutting edges have to virtually contact, but it is the result of two firmly held sections of material being moved relative to one another so that a high shear stress develops along the plane between these two sections and causes yield along this plane. With some materials that shear easily, a piece of chocolate is an example, a movement which is considerably less than the depth of the material being sheared will result in the sections being sheared. In the case of frozen food material such as fish it is preferred that movement of the jaws, to cause this relative movement of adjacent sections of the material, reaches the point where the jaw sections intermesh since in addition to the basic shearing operation as described, any remaining fibres which may not have been completely severed by the shearing action will then be cut by a scissor action between approaching edges of the protruding sections of the jaws, and also there will be slight polishing of the sheared edges during the further movement, so resulting in sheared pieces having very clean edges. In practice at the point when the sections intermesh the clearance between adjacent protruding sections is desirably about 5 thousandths of an inch.

Thus, full intermeshing ensures a clean cut in the frozen material without tearing, as well as causing slight polishing of the cut edges.

The requirements for shearing will depend on the properties of the particular material to be sub-divided. If the temperature is too low the material shatters while if it is too high distortion of the structure of the material can occur. It has been found that frozen filletted fish can be sheared satisfactorily when the temperature is of the order of −5° to −10°C. it will be realised that there will be extreme conditions in terms of size where material cannot be sheared, but satisfactory results have been achieved when shearing 1 cm thick slabs of frozen fish to form fish fingers and trapezoidal cod steaks. Regarding size, it will normally be easier and more convenient to shear across the minimum width of the required unit portions, i.e., the width of the slab will be less than the width of each section of each jaw, and probably by a factor of at least two to one.

The slab may be fully clamped prior to shearing to minimise distortion of the slab during shearing and ensure a clean straight shear at the sub-division lines. Small portions may not require any specific measures to achieve this beyond bringing the jaws together so that the protruding jaw sections fully contact the slab prior to the shearing operation, but it is preferred that spring mounted clamps are mounted in each of the jaw receding sections so as to hold the slab resiliently against movement of the opposing protruding sections during shearing.

Preferably the unit portions are brought back into the same plane subsequent to shearing since this facilitates the subsequent handling of the sub-divided unit portions. For this purpose the spring mounted clamps located within the receding sections of at least one of the jaws should be capable of storing sufficient strain energy during shearing to force the unit portions back into a co-planar rellationship subsequent to the shearing operation. It is however not always essential that the portions should be brought back into the same plane; other systems for conveying the portions away are also possible.

Thus, it is sometimes desirable that after the jaws are moved apart, the unit portions should be conveyed away while alternate portions lie in different planes. This has the advantage of ensuring that portions do not weld together again after shearing and during subsequent conveying operations. Conveniently with this arrangement a new slab coming in to be sheared may push out the alternate unit portions still remaining in that plane while longer conveyor pushers convey out the sheared portions lying at a different plane.

Where a large slab is to be divided into a relatively large number, say fifteen or more, of smaller portions, it is preferable to employ two stages of shearing one stage being to shear in one direction relative to the slab, and the other being to shear in a direction perpendicular to the first direction. It has generally been found convenient that for a rectangular slab having a greater length than breadth, it is best to shear longitudinally first and then to shear laterally afterwards. Conveniently a composite shear press may do both forms of shearing. Thus, a single composite shear press may be arranged to provide shearing in two stages which are longitudinal and lateral to the slab and the method may comprise moving the slab to a first position where part of the shear press shears in a first direction relative to said slab and then moving the sheared sections of the slab to a second position where shearing of said sections along a direction perpendicular to said first direction to form the unit portions may be affected, A convenient method is that in which after shearing longitudinally at the first position the longitudinal sheared sections of food material are transferred to said second position with alternate longitudinal sections of food material lying in different planes and said longitudinal sections of food material are then sheared laterally into unit portions by longitudinally alternate protruding and receding jaw sections, each jaw section being stepped laterally in correspondence with the levels of said planes. This arrangement ensures that subsequent to the second stage of shearing, no two unit portions lie adjacent one another and therefore there is no risk of these portions re-welding to one another. With this method the greatest risk of re-welding is between adjacent long sides of the sheared unit portions. Provided these are retained separately it is possible to bring back the laterally sheared unit portions into the original longitudinal planes and to convey away the unit portions while aligned in these separate longitudinal planes.

The sub-division lines between adjacent sections need not be square to the slab, but may be alternately at different oblique angles (while retaining a rectangular cross-section) so as to produce trapezoidal pieces. It is also possible for the sub-division lines to be curved so as to cut out particular shapes e.g. fish shapes. One method is to cut by means of sub-division lines between jaw sections which are alternately S shaped and the mirror image of this, to produce a series of fish shapes from jaw sections whose faces have that shape in plan view. In the case of fish fingers however the lines will normally be parallel, straight, and relatively close together.

An embodiment of the invention will now be described by way of example with reference to the accompanying diagrammatic drawings in which:

FIGS. 5 to 9 show a second embodiment; and

FIGS. 10 to 14 show a third embodiment.

Figure 1:
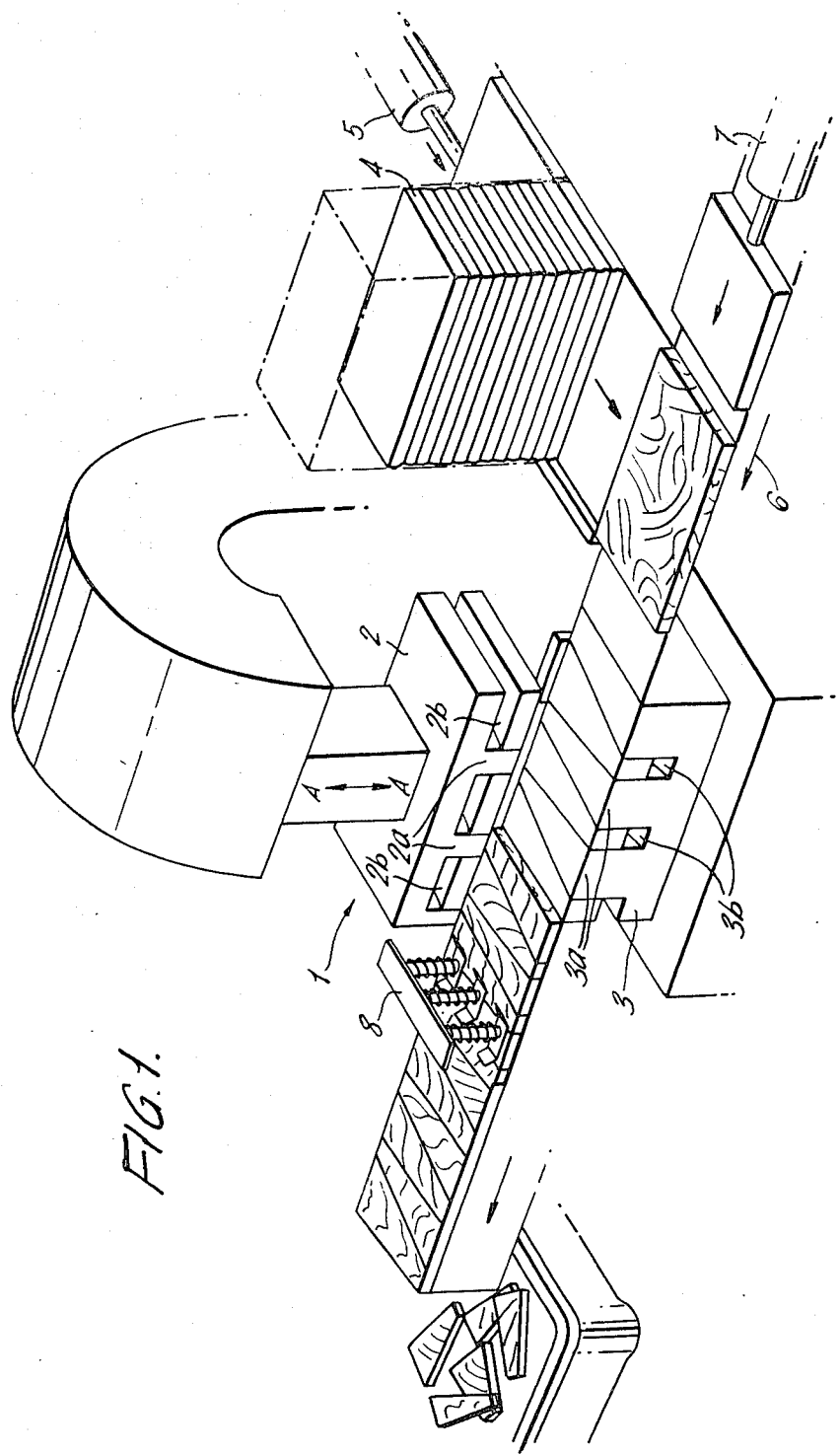
FIG. 1 shows a perspective view of a press.

The shear press 1 shown in FIG. 1 has opposing castellated jaws 2 and 3. Each jaw has alternate protruding sections 2a, and 3a respectively and receding sections 2b, and 3b respectively which are rectangular in side elevation and correspond in plan to the shape of the portions. The opposing jaws are located so that the protruding sections of one lie opposite the receding sections of the other, and the upper jaw 2 is moveable in the direction of arrow AA to enable the two jaws to intermesh for shearing. The press is hydraulically operated at a relatively high load, i.e., of the order of 1 ton weight.

A stack 4 of slabs of frozen fisn is located to the side of the press and a hydraulically operated feed cylinder 5 is arranged to feed slabs from the underside of this stack into a conveying path 6, and a further feed cylinder 7 then feeds the slabs along this conveying path.

Feed cylinder 7 has a predetermined stroke which ensures that each slab in turn is correctly located in the position between the jaws 2 and 3, and also provides the force to convey a series of slabs further along this conveying path 6 against the action of a braking mechanism 8 which ensures that a line of slabs remains under control despite their lightness and low friction during this conveying operation.

Figure 2:
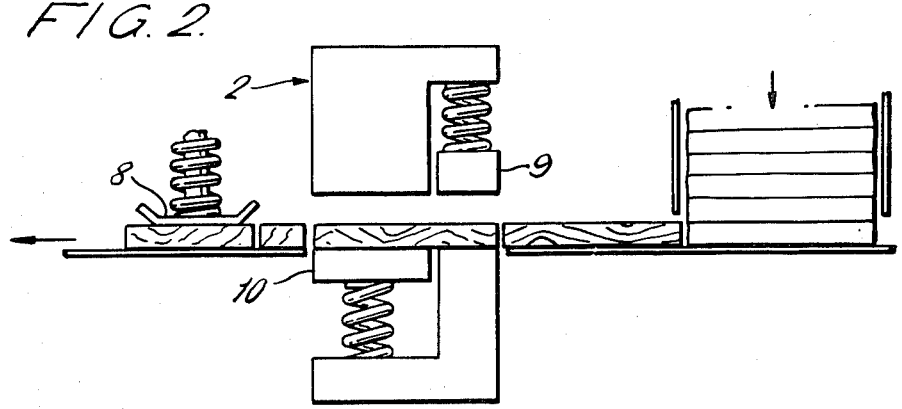
FIG. 2, 3 and 4 show sectioned side elevations of the press in operation.
Figure 3:
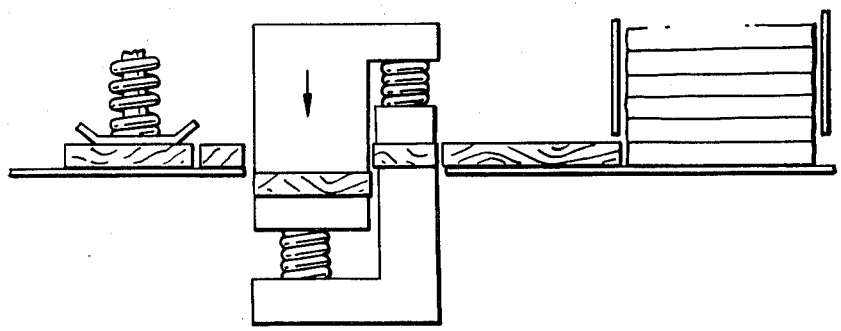
Figure 4:
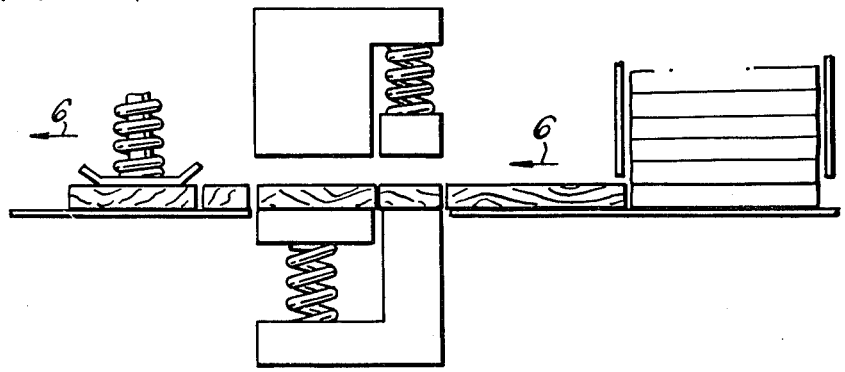

Reference will now be made to FIGS. 2, 3 and 4 which show the shearing and re-locating action.

Mounted within the recessed sections of the upper and lower jaws are spring mounted clamps 9 and 10. In operation with a slab of frozen food material correctly positioned between the jaws, the upper jaw 2 comes down to clamp the slab and further movement into an inter-meshing position (see FIG. 3) shears the portions while the slab remains clamped. The clamping and shearing movements are continuous.

The upper jaw is then raised again as at FIG. 4 and the action of the lower spring clamp 10 in relaxing to its uncompressed state brings the sheared unit portions back into a co-planar relationship so that they can be fed on in the conveying direction 6 by movement of the feed cylinder 7.

Trapezoidal portions of frozen cod were produced on the apparatus of FIG. 1 by sub-dividing slabs of previously frozen filletted material. These portions measured 10 mm × 120 mm × 25 → 62 mm. Fish fingers measuring 10 mm × 20 mm × 90 mm have also been produced on similar equipment.

Figure 5:
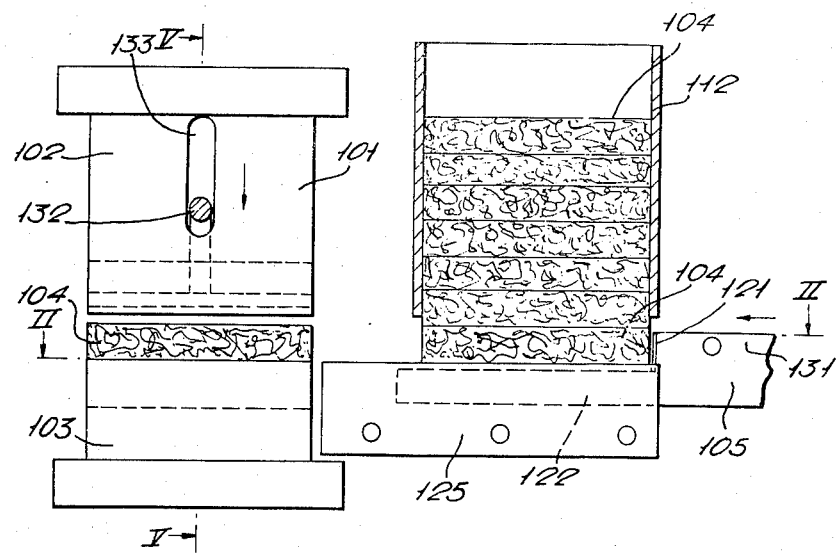
Figure 6:
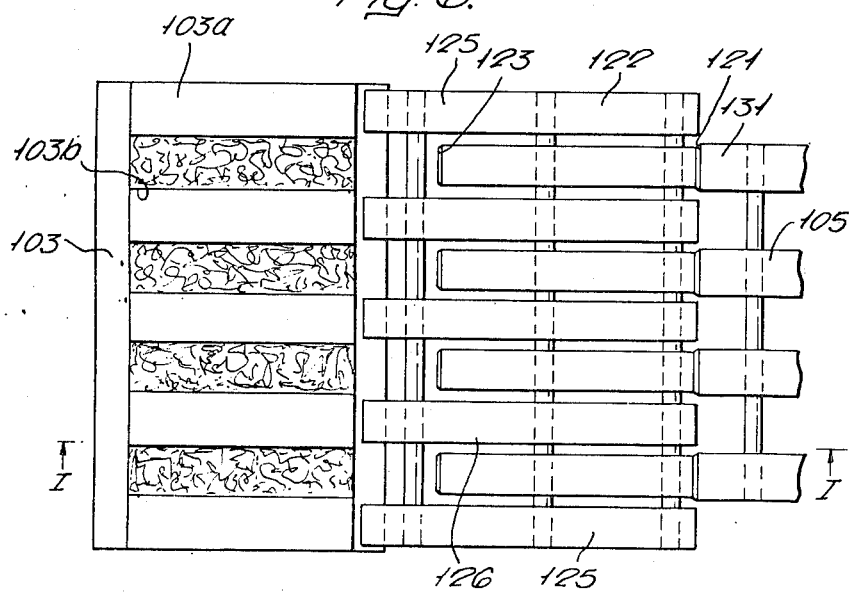

The second embodiment will now be described in what follows with reference to FIGS. 5 to 9 in which:

FIG. 5 is a vertical section along the line I—I of FIG. 6 showing the shearing mechanism and the feeding and expelling apparatus prior to commencement of the shearing process.

FIG. 6 and is a view from above along the line II—II of FIG. 5, showing the shearing mechanism with the feeding and expelling apparatus prior to the commencement of shearing.

FIG. 7 is a vertical section along the line III—III of the shearing mechanism with the feeding and expelling apparatus after the shearing process, and the feeding or expelling phase.

FIG. 8 is a view from above along the shearing line IV—IV of the shearing mechanism with the feeding and expelling apparatus after the shearing process, and the feeding or expelling phase.

Figure 9:
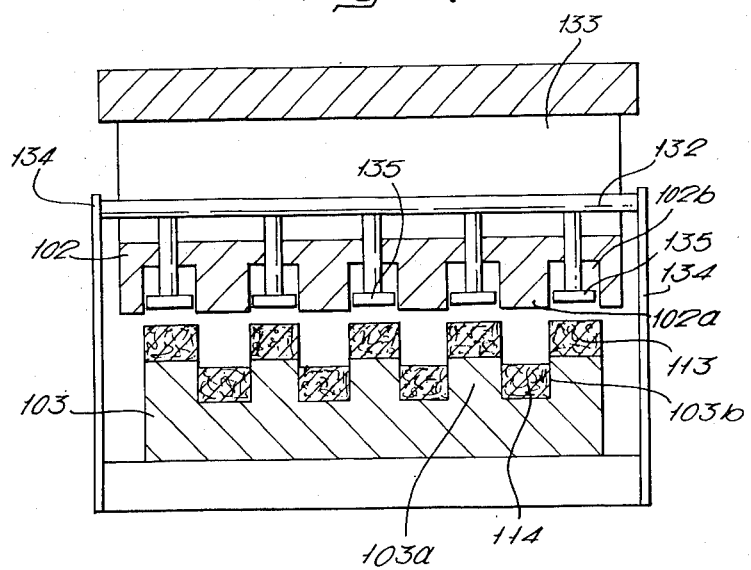

FIG. 9 is a longitudinal section through the shearing mechanism along the line V—V.

The shearing mechanism 101 essentially comprises an upper mechanism 102 and a lower mechanism 103 (cf particularly FIG. 9) with protruding sections 102a, 103a, and receding sections 102b, 103b which are rectangular in side elevation and correspond in plan to the portions required, a carrier 132 running axially through the upper mechanism 102 in an elongated slot 133, and static expellors 135 built into the receding sections 102b of the upper mechanism 102. The deflectors 135 are adapted to the receding sections 102b and firmly attached to the carrier 132. The carrier is also firmly attached to two end plates 134 attached to the lower mechanism 102. The upper and lower protruding sections 102a, 103a and receding sections 102b, 103b are disposed above one another in such a way that when the shearing mechanism 101, closes a protruding section 102a 103a is always intermeshed with a receding section 103b or 102b. The receding sections 102b, 103b are expediently only a few tenths of a millimeter, and not more than about 2 mm, wider than the protruding sections 102a, 103a. The upward motion, which is an essential part of the shearing process, is made only by the upper mechanism 102 in the direction of the arrow in the embodiment illustrated in the drawings.

A feeding and expelling apparatus 105 is also incorporated in the shearing apparatus 101 (cf. FIGS. 5 to 8), having push plates 121 and lower fingers 122 which push plates 123. The push plates 121 may preferably, as shown in the diagram, be located on individual upper fingers 131 or be joined together to form one continuous plate. The lower fingers 122, which are about 1 cm longer between the push plates 121 and 123 than a finished unit portion, are firmly joined together and move in a horizontal plane which is necessary for the feeding and expelling process between supporting members 125. The supporting members are expediently joined together to form a grid 126. The fish fillet slabs 104 to be sheared are stacked in a compartment 112 above the retaining devices 125. The fish fillet slabs 104 are at a temperature of −8° to −18°C, expediently about −12°C. FIG. 5 shows a fish fillet slab 104 which has been fed on to the lower mechanism 103. For the shearing process, the upper mechanism 2 makes a downward movement in the direction of the arrow on to the lower mechanism 103.

The ensuing intermeshing of the protruding sections 102a, 103a with the receding sections 103b, 102b produces a shearing action which divides the fish fillet slab 104 into upper and lower unit portions 113 and 114, which are accommodated by the receding sections 102b, 103b (FIGS. 7 and 9). The static expellors 135 by a relative movement come out of the upper recess 102b, expel the upper unit portions 113 from the receding sections 102b during the returning upward motion of the upper mechanism 102, so that the portions come to rest on the protruding sections 103a. This avoids any possibility of the portions sticking in the receding sections 102b.

The feeding and expelling apparatus with the push plates 121 then pushes a new fish fillet slab 104 out of the compartment 112 over the supporting members 125 on to the lower mechanism 103. The upper unit portions 113 are dislodged and pushed forward by the front edge of the fish fillet slab 104, and the lower unit portions 114 in the receding sections 103b are pushed by the push plates 123 of the lower pushing finger 122, in two planes on to a removal conveyor which is not illustrated or specified in greater detail. After the fish fillet slab 104 is moved through the position shown in FIG. 75, the feeding expelling apparatus 105 returns to its initial position as shown in FIG. 5 and causes the stack of fish fillet slabs to drop down a distance equal to the thickness of one fish fillet slab 104. The upper mechanism 102 is then set in motion again in the direction of the arrow and the process repeats itself in the manner described above.

The fish fillet slabs 104 specified in the example may, e.g. be 12 mm thick and be sheared into unit portions measuring 20 × 83 = 12 mm, known as fish fingers or fish sticks.

The fish finger produced using this apparatus exhibit a high degree of accuracy as regards dimensions and have a faultless surface, despite the vulnerable structure of the fish meat. Due to the rectangular shapes of the protruding and receding sections and the very small clearance between the protruding and the receding sections, shear 15 is at virtually 90° to the slab and there is virtually no distortion of the long narrow fish fingers, so that they present an impeccable rectangular cross-section.

An important advantage of this method is that since the sheared portions are conveyed away at different levels there is no tendency for them to weld to one another during subsequent handling.

A third embodiment for larger fish fillet slabs which are cut both lengthwise and transversely to form fish fingers is described and illustrated with reference to FIGS. 10 to 16, in which:

FIG. 10 is a cross section of the shearing mechanism with the first and second shearing station I, II along the line of intersection VI-VI;

FIG. 11 is a top view of the lower mechanism with partially and completely sheared fish fillet slabs;

FIG. 12 is a section through the second shearing station II along the line of intersection VIII—VIII;

FIG. 13 is a section through the second shearing station II along the line of intersection IX—IX;

FIG. 13a is also a section through the second station II along the line IX—IX and shows the upper and lower shearing mechanisms coming together; and FIG. 14 illustrates the second shearing station II along the line X—X after the upper and lower mechanisms have come together.

The fish fillet slabs 204 are, as in the previous embodiment, pushed by fingers 222 with upper push plates 221 between the upper jaw 252 and the lower jaw 253 of the first shearing station I. The upper mechanism 252 is provided with a projecting bar section 252a which is of the same dimensions as a receding section 253b located opposite it in the lower mechanism 253. Integrally attached to the upper mechanism 252 and located at a second shearing station II is a further upper jaw 202 below which is a lower jaw 203 (see FIG. 16).

Alternate receding and protruding sections 202a and 262a are carried in the upper jaw 202 along its centre line. The sections 202a and 262a are the width of the centre bar 252a and the length of a finished fish portion. The receding section 202a is as deep as the centre bar 252a and the protruding section 262a projects twice as deep as the section 202a. The protruding sections 262a are arranged in such a way that a section 202a is always followed by deeper protruding section 262a and vice versa, so that the deeper and shallower sections alternate over sectors $\alpha$, $\beta$, $\gamma$, $\delta$, $\epsilon$ (see FIG. 14).

Further protruding sections 282a project on each side of the deep protruding sections 262a in the sectors $\beta$ and $\delta$ to the same depth as the projections 202a; while alongside the receding sections 202a are shallower receding sections having the same depth as the receding sections of the upper jaw at station I. Thus referring to FIGS. 12 and 13 each jaw has a laterally stepped profile corresponding to the levels of the longitudinally sheared bar sections. FIG. 12 shows the receding section cross-hatched, while FIG. 13 shows the protruding section cross-heated. The surface areas of all the sections are the same as those of the finished fish portions.

Opposite the receding and protruding sections 202a and 262a along the centre line are corresponding protruding and receding sections 263b in the lower mechanism. The dimensions are the same as those of the receding section 253b of the first shearing station.

The longitudinal sides of the lower mechanism 203a are bounded by guide rails 241, 242 in (FIG. 12). The lower jaw is divided at lateral dividing lines into five sectors $\alpha_1$, $\beta_1$, $\gamma_1$, $\delta_1$, $\epsilon_1$, each of which is the same length as a finished fish portion. The sectors are vertically movable in relation to each other. In the embodiment illustrated the sectors $\alpha_1$, $\gamma_1$, $\epsilon_1$, are fixed, whereas the sectors $\beta_1$, and $\delta_1$, are vertically movable downwards by at least the thickness of a finished fish portion (FIG. 13a and FIG. 14) against a resilient support. The vertically movable sectors are located by means of side plates 291, 292 with respect to the upper mechanism (FIG. 13 and 13a).

The machine operates in such a way that the fish fillet slab 204 is sheared longitudinally in the first shearing station into longitudinal sections A, B and C and in the second station is sheared laterally into finished fish portions $a_1$, $a_2$, $a_3$, $a_4$, $a_5$; $b_1$, $b_2$, $b_3$, $b_4$, $b_5$; $c_1$, $c_2$, $c_3$, $c_4$, $c_5$ by stroke movements of the upper mechanisms 252 and 202 against the lower jaw mechanisms 253 and 203. This takes place after the fish fillet slab 204 has been pushed into the first shearing station I. In the process the front edge of the fish fillet slab 204 pushes the longitudinal strips A and C produced in the preceding cycle into the second shearing station. At the same time the longitudinal strip B, lying at a lower level, is pushed by the push plate 223 into the second shearing station II.

The longitudinal strips A, B, C push the finished fish portions $a_1$ - $a_5$; $b_1$ - $b_5$; $c_1$ - $c_5$ produced in the preceding cycle on to a conveyor belt (not illustrated). After the pushing operation, the upper mechanisms 252, 202 both move against the lower mechanisms 253, 203, in the first shearing station shearing the fish fillet slab 204 into strips, A, B, C and in the second shearing station dividing the strips A, B, C, formed in the preceding cycle, into the finished fish portions $a_1$ - $a_5$, $b_1$ - $b_5$, $c_1$ - $c_5$. This is done in the first shearing station by the protruding section 252a pressing the strip B into the receding section 253b, and in the second shearing station by the sectors $\beta$ and $\delta$, the upper mechanism 202 both making a downward stroke movement equal to the thickness of a longitudinal strip. In this way the longitudinal strips A, B, C are divided into individual portions. Following this division into portions, the upper mechanism is raised, thus, through recovery of the spring compression, returning the sectors $\beta$ and $\delta$ to their initial position, so that the sheared portions are back in the longitudinal planes of A, B and C and the succeeding strips A, B, C can push out the fish portions satisfactorily.

What is claimed is:

1. A method of forming unit portions from slabs of frozen food material, comprising the steps of bringing each slab in turn between opposing castellated jaws of a press having in each jaw alternate protruding and receding sections in which each protruding section has a substantial flat jaw face, a width corresponding to the required width of the unit portions and is shaped to closely intermesh with a receding section of the opposing jaw, bring the jaws together so that the protruding sections evenly contact the slab, and moving the jaws towards an intermeshing position so as to shear and thereby subdivide the slab into unit portions, said shearing resulting in a high shear stress developing along the plane between said unit portions and causing yield along said plane.

2. A method according to claim 1 in which spring mounted clamps are mounted in the receding sections of each jaw, and the process comprises the further step of moving the jaws apart and causing the sheared portions to be pushed back into a single plane by return movement of the clamps after which the sheared portions are conveyed away while in said plane and in an aligned disposition.

3. A method according to claim 1 in which subsequent to shearing, the jaws are moved apart and the unit portions are conveyed away while alternate portions lie in different planes.

4. A method according to claim 1 in which each slab is sheared in two stages, one stage being longitudinal and the other lateral to the slab.

5. A method according to claim 4 in which a single composite shear press is arranged to provide shearing in two stages which are longitudinal and lateral to the slab and the method comprises moving the slab to a first position where part of the shear press shears in a first direction relative to said slab, and then moving the sheared sections of the slab to a second position where shearing of said sections along a direction perpendicular to said first direction to form the unit portions is effected.

6. A method according to claim 5 in which at said first position shearing is effected longitudinally to the slab, the longitudinal sheared sections of food material are then moved to the second position and are sheared laterally into the unit portions at the second position.

7. A method according to claim 6 in which after shearing at the first position the longitudinally sheared sections of food material are transferred to said second position with alternate longitudinal sections of food material lying in different planes and said longitudinal sections of food material are then sheared laterally into unit portions by longitudinally alternate protruding and receding jaw sections which are stepped laterally in correspondence with the levels of said planes.

8. A method according to claim 7 in which subsequent to being sheared laterally the unit portions are moved back into alignment into said longitudinal planes and are conveyed away in said longitudinal planes.

* * * * *